US007992127B2

United States Patent
Loupia et al.

(10) Patent No.: US 7,992,127 B2
(45) Date of Patent: *Aug. 2, 2011

(54) METHOD AND SYSTEM OF ENCAPSULATING WEB SITE TRANSACTIONS FOR COMPUTER-AIDED GENERATION OF WEB SERVICES

(75) Inventors: David Loupia, Carros (FR); Marc Fiammante, Saint Laurent du Var (FR); Lionel Mommeja, Nice (FR)

(73) Assignee: International Business Machines Corporation, Armonk, NY (US)

( * ) Notice: Subject to any disclaimer, the term of this patent is extended or adjusted under 35 U.S.C. 154(b) by 1325 days.

This patent is subject to a terminal disclaimer.

(21) Appl. No.: 11/303,375

(22) Filed: Dec. 16, 2005

(65) Prior Publication Data

US 2006/0168115 A1   Jul. 27, 2006

(30) Foreign Application Priority Data

Dec. 23, 2004   (EP) ..................................... 04300946

(51) Int. Cl.
 *G06F 9/44* (2006.01)
 *G06F 3/00* (2006.01)
(52) U.S. Cl. ......... 717/106; 717/105; 717/109; 719/313
(58) Field of Classification Search .................. 717/105, 717/106, 109; 719/313
See application file for complete search history.

(56) References Cited

U.S. PATENT DOCUMENTS

| 6,957,420 | B2 * | 10/2005 | Hand et al. ..................... 717/125 |
| 7,404,188 | B2 * | 7/2008 | Luty et al. ...................... 719/315 |
| 7,487,508 | B2 * | 2/2009 | Fu et al. ......................... 719/310 |
| 7,620,934 | B2 * | 11/2009 | Falter et al. .................... 717/106 |
| 2003/0233631 | A1 * | 12/2003 | Curry et al. ................... 717/100 |
| 2004/0117759 | A1 * | 6/2004 | Rippert et al. ................. 717/100 |
| 2004/0255046 | A1 * | 12/2004 | Ringseth et al. .............. 709/246 |
| 2004/0268303 | A1 * | 12/2004 | Abe et al. ....................... 717/108 |
| 2005/0257196 | A1 * | 11/2005 | Hollander et al. ............. 717/115 |
| 2006/0074734 | A1 * | 4/2006 | Shukla et al. ..................... 705/8 |

FOREIGN PATENT DOCUMENTS

JP    2004272871 A  *  9/2004

* cited by examiner

*Primary Examiner* — Lewis A Bullock, Jr.
*Assistant Examiner* — Hang Pan
(74) *Attorney, Agent, or Firm* — Andrea Bauer; Hoffman Warnick LLC

(57) ABSTRACT

A system and method for automatically generating web services from an existing web site having web page based business processes or transactions. A script is generated representative of the user navigation sequence involved to perform the transaction. The script elements include the web application calls, input/output parameters, and the interrelation between the elements of the transaction. A WSDL file, web service interface code, and web service implementation code are automatically, i.e. computer-aided, generated from the navigation script without a user required to have advance programming skills. The web service may be published locally to the web site or on a remote site.

11 Claims, 11 Drawing Sheets

METHOD AND SYSTEM OF ENCAPSULATING WEB SITE TRANSACTIONS FOR COMPUTER-AIDED GENERATION OF WEB SERVICES

CLAIM FOR PRIORITY

This application claims the benefit of European Patent Application No. 04300946.3, filed Dec. 23, 2004, which is hereby incorporated herein.

FIELD OF THE INVENTION

This invention relates to web services technology, and more particularly to computer-aided generation of web services by encapsulating web page based transactions as web services from an existing web application.

BACKGROUND OF THE INVENTION

Every year, more and more business is being transacted over the internet. Business processes or transactions conducted over a network such as the internet are typically implemented through web pages with software components called web applications enabling the transactions. Some enterprises having internet sites with transactional capabilities offer business to customer (B2C) or business to business (B2B) communications.

B2C communication is described with reference to FIG. 1. Traditionally a user 16 conducts transactions on the internet 12 with a web application interface 32 of the web application 18 as shown via the dashed arrows in FIG. 1. The user typically accesses the transactions 22-24 of the web application 18 via the internet 12 and the web application interface 32 through web pages of the web application. Web pages are typically written in hypertext markup language (HTML) for browsers on personal computers, wireless markup language (WML) for browsers on mobile phones, or the like. The web application 18 presents an interface to the user by providing web pages which the user navigates to perform the transactions 22, 24.

B2B communication is also described with reference to FIG. 1. For B2B communication, the web application on the server side must provide a programming interface to client applications. For this purpose, web services have been developed.

A web service is a software component that is well understood by a skilled person in the industry. The strength of web services is the standardized way to integrate various heterogeneous applications without the prior knowledge of the specific implementation of each application. Web services allow different applications implemented in different sources to communicate by using standardized description language such as Web Service Description Language (WSDL), simple object access protocol (SOAP), and universal description, discovery, and integration (UDDI). A WSDL file is a description language file written in extensible markup language (XML) that describes the functions and their associated input/output parameters provided by the web service which may be called by a user application (also called a web service client). The user application before accessing the web service reads the WSDL file and adapts its calls accordingly. The WSDL file may be stored on the same server as the server hosting the web service or in a different server or directory. Web services allow a programmatic access to distributed transactions over the internet to provide data or functionality to another application.

However, creating, deploying and publishing web services to conduct transactions for web applications is complex and requires advanced programming skills. The amount of programming required is time intensive and the cost involved is substantial, for example complex components such as application servers are typically required. Often, enterprises are not able to afford the expense associated with web services technology.

The current approach to build and deploy a web service 14 is shown in the computer network system 10 of FIG. 1. Such web services are typically programmed by the service provider or owner of the web application 18 and implemented on the same web server 26 hosting the web application. The web service 14 consists of two logical blocks, one for interfacing with the user application 20, i.e. the web service interface 28, and one for interfacing with the web application 18, i.e. the web service implementation 30. Knowledge of the web server and web application language code allows the owner to program and deploy the web service interface 28 and web service implementation 30 that interacts directly with the code of the web application to conduct the transactions 22-24. The web service interface 28 interacts with a user application 20 via a network, such as the internet 12, to execute calls from the user application and conduct the transactions 22-24 of the web application 18. The web service interacts directly with the transactions via the web service implementation 30. Although advanced programming skills are required to implement the web service, this is a common technique of implementing web services that is well known in the art. The interrelation between user application, web application transactions, and web service is shown via solid arrows in FIG. 1.

The main problems with previous approaches are that advanced programming skills are necessary and knowledge of transaction interface of the web application is required to implement and deploy the web service.

Another approach provides a system and method for aiding a user to build web services from existing web page-based transactions by navigating in a web site such as B2C web site and indicating what the web services are, for example, among the graphical elements that are part of the web page. Essentially, a user may develop a web service without having the knowledge of the web application transaction programming interface. The user is able to select input and output parameters, and define the interrelation between parameters. In a feature, an automata may record the navigation sequence to execute a specific transaction corresponding to a specific web service, which automates the process with this respect. However, further automation of the process would be useful, in particular for a user having limited programming skills since further automating the process is still requires programming skills to implement.

Thus, there is a need for a system and method for computer-aided generation of web services from web-page based transactions as web services from an existing web site. There is a need for a system and a method for generating web services that alleviates the problems associated with the previous approaches.

SUMMARY OF THE INVENTION

It is an object of the invention to provide a system and method for computer-aided development of a web service from existing web sites without requiring the user to have advanced computer programming skills.

In accordance with an embodiment of the invention, there is provided a method for generating a web service providing a programming interface between a web application and a user application, said method comprising the steps of creating a human readable navigation flow defining a script of a navigation flow of at least one transaction of the web application, the navigation flow representative of interactions between a user and the web application interface of the web application during said at least one transaction, the human readable navigation flow created by interaction between a user and graphical user interface recording the navigation flow of the human user conducting a transaction in the web application; automatically creating a text file describing a function and input or output parameter data identified by the user in the graphical user interface to be called by the user application for executing the at least one transaction represented by the navigation flow by mapping the input and output parameter data to form the text file; automatically creating with a code converter a web service interface code corresponding to the call of functions as described in the text file; and automatically creating with the code converter a web service implementation code for executing the interactions corresponding to the at least one transaction as represented by the navigation flow.

In an embodiment, the navigation flow may be generated with a regression test tool. The system may import a script generated by a regression test tool and produce a human readable script for generating the web service implementation code. The navigation flow may be written in script language, and the text file may be a WSDL file.

Another aspect of the invention provides a system for generating a web service providing a programming interface between a web application and a user application, said system comprising means for creating a human readable navigation flow defining a script of a navigation flow of at least one transaction of the web application, the navigation flow representative of interactions between a user and the web application interface of the web application during said at least one transaction, the human readable navigation flow created by interaction between a user and graphical user interface recording the navigation flow of the human user conducting a transaction in the web application; means for automatically creating a text file describing a function and input or output parameter data identified by the user in the graphical user interface to be called by the user application for executing the at least one transaction represented by the navigation flow by mapping the input and output parameter data to form the text file; means for automatically creating with a code converter a web service interface code corresponding to the call of functions as described in the text file; and means for automatically creating with the code converter a web service implementation code for executing the interactions corresponding to the at least one transaction as represented by the navigation flow.

In an embodiment, the navigation flow may be generated by a regression test tool. The navigation flow may be written in script language, and the text file may be a WSDL file. The web service may be implemented in a web server hosting the web application. The web application may be hosted on a web server, and the web service may be hosted by another server.

Another aspect of the invention provides a computer program product comprising a computer readable medium having computer readable program code embodied therein for generating a web service providing a programming interface between a web application and a user application, the computer readable medium program code comprising a computer readable program code for creating a human readable navigation flow defining a script of a navigation flow of at least one transaction of the web application, the navigation flow representative of interactions between a user and the web application interface of the web application during said at least one transaction, the human readable navigation flow created by interaction between a user and graphical user interface recording the navigation flow of the human user conducting a transaction in the web application; a computer readable program code for creating a text file describing a function and input or output parameter data identified by the user in the graphical user interface to be called by the user application for executing the at least one transaction represented by the navigation flow by mapping the input and output parameter data to form the text file; a computer readable program code for creating with a code converter a web service interface code corresponding to the call of functions as described in the text file; and a computer readable program code for creating with the code converter a web service implementation code for executing the interactions corresponding to the at least one transaction as represented by the navigation flow.

DETAILED DESCRIPTION OF THE INVENTION

Figure 1:
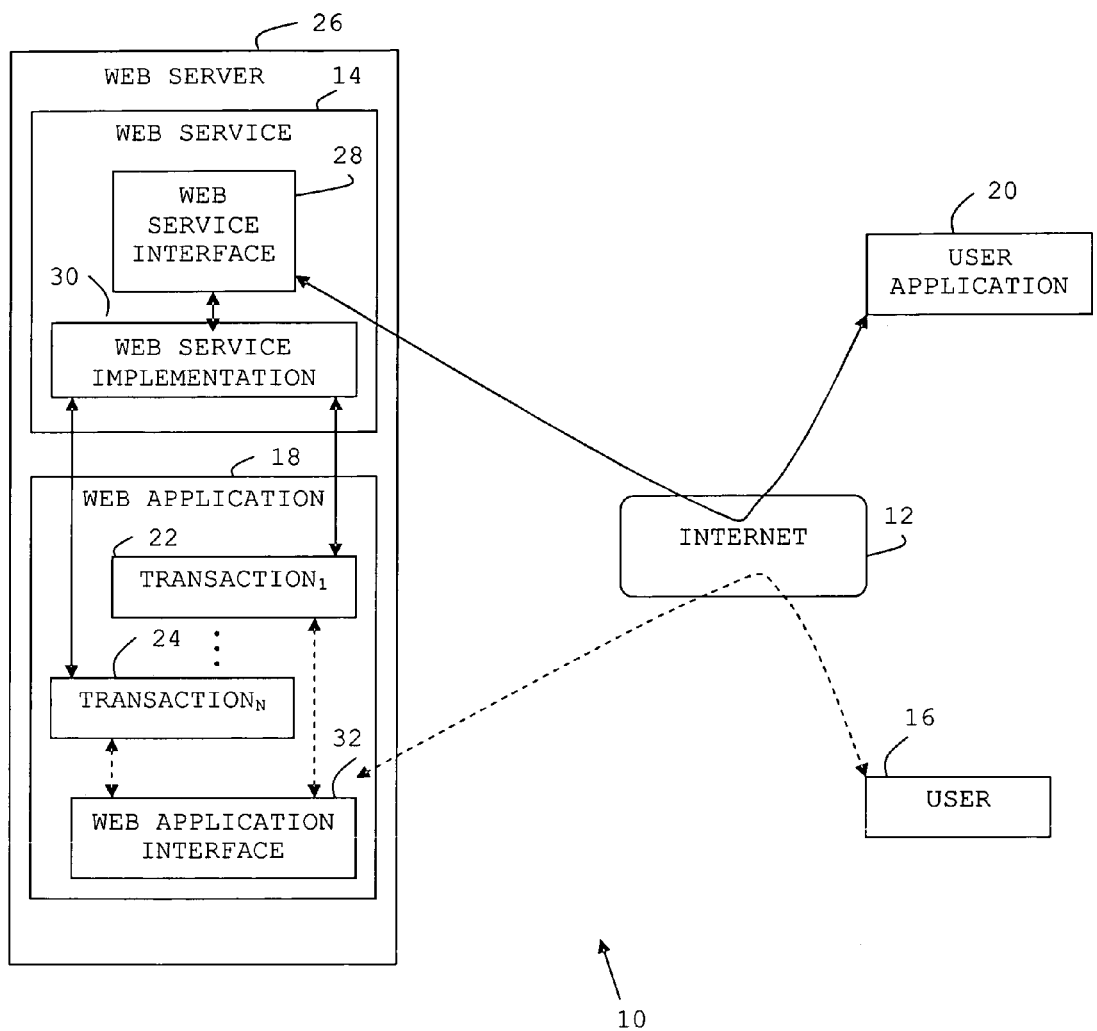
FIG. 1 shows a computer network system with a web service implementation according to the prior art.
Figure 2:
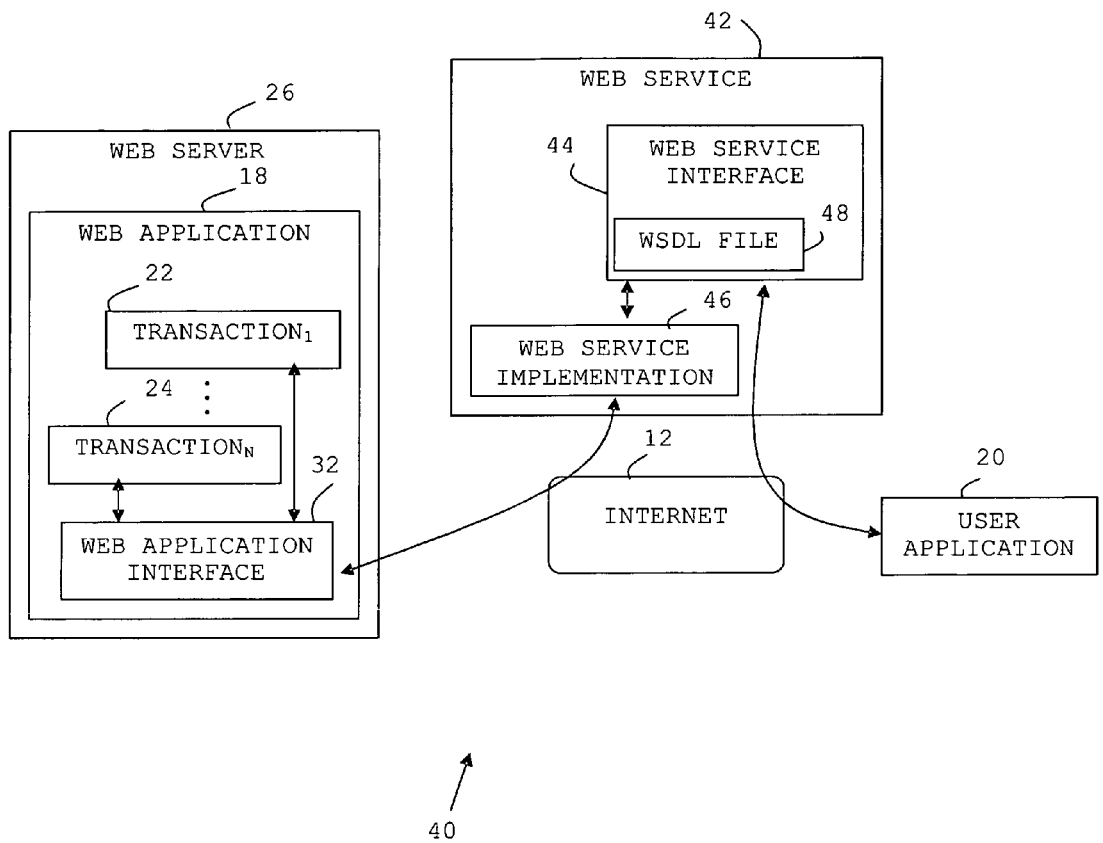
FIG. 2 shows a computer network system implementing an embodiment of the invention.

An embodiment of the invention may be implemented in the computer network 40 shown in FIG. 2. A web application is implemented on a web server 26 or an external web site provider in a network such as the internet 12. The web application is implemented on the web server 26 with one of any number of platforms that are well known in the industry. The web server may be configured to host one or more web applications 18. The web application may be configured with at least one transaction$_{1-N}$ 22-24. Of course, it will be appreciated that transaction 22-24 may include transactions as defined in the broadest sense, such as processes, retrieval of information, perform a function, or the like, and is not taken to be limited to merely business transactions. A user application 20 may send calls for conducting the transactions of the web application via the web service 42. The web service may be created on the basis of an existing web application without requiring any change to the existing application interface. The web service 42 may be implemented on the web server 26 of the web application 18 or on another server separate or external from web server 26. A web service implementation 46 of the web service 42 in accordance with the present invention interacts with the web application 18 via the same web application interface 32 which is available to the user 16 of the web application.

In FIG. 2, in the web service of an embodiment of the invention, the web service 42 interfaces and interacts with the web application 18 via the internet 12 with the web application interface 32 of the web application 18. A user application 20 calls transactions 22-24 in the web application 18 of the web server via a web service interface 44. A WSDL file 48 from the web service interface 44 of the web service 42 is initially read by the user application 20 before sending calls to the web service interface 44. The web service interface 44 receives the calls from the user application 20, and communicates the calls via web service implementation 46 across the network 12 to the web application interface 32 of the web application 18 to run the transactions 22-24. The web service implementation calls the web application interface and simulates the web page interactions which are made by a user running a transaction of the web application.

In an embodiment of the invention the user application 20 acts as a web service client to perform a function such as a transaction 22-24 remotely. It will be appreciated that the client or user application 20 may interface or call one or more web services 42 via the internet, however only one web service 42 is shown for illustrative purposes. The web service 42 or portions of the web service may be generated manually or automatically, as discussed in further detail with reference to FIG. 3, from the existing web application in order to allow connection from the client application. In another embodiment, the web service 42 may be hosted (not shown) by the same web server 26, or the web service may be hosted by an external service provider.

Figure 3:
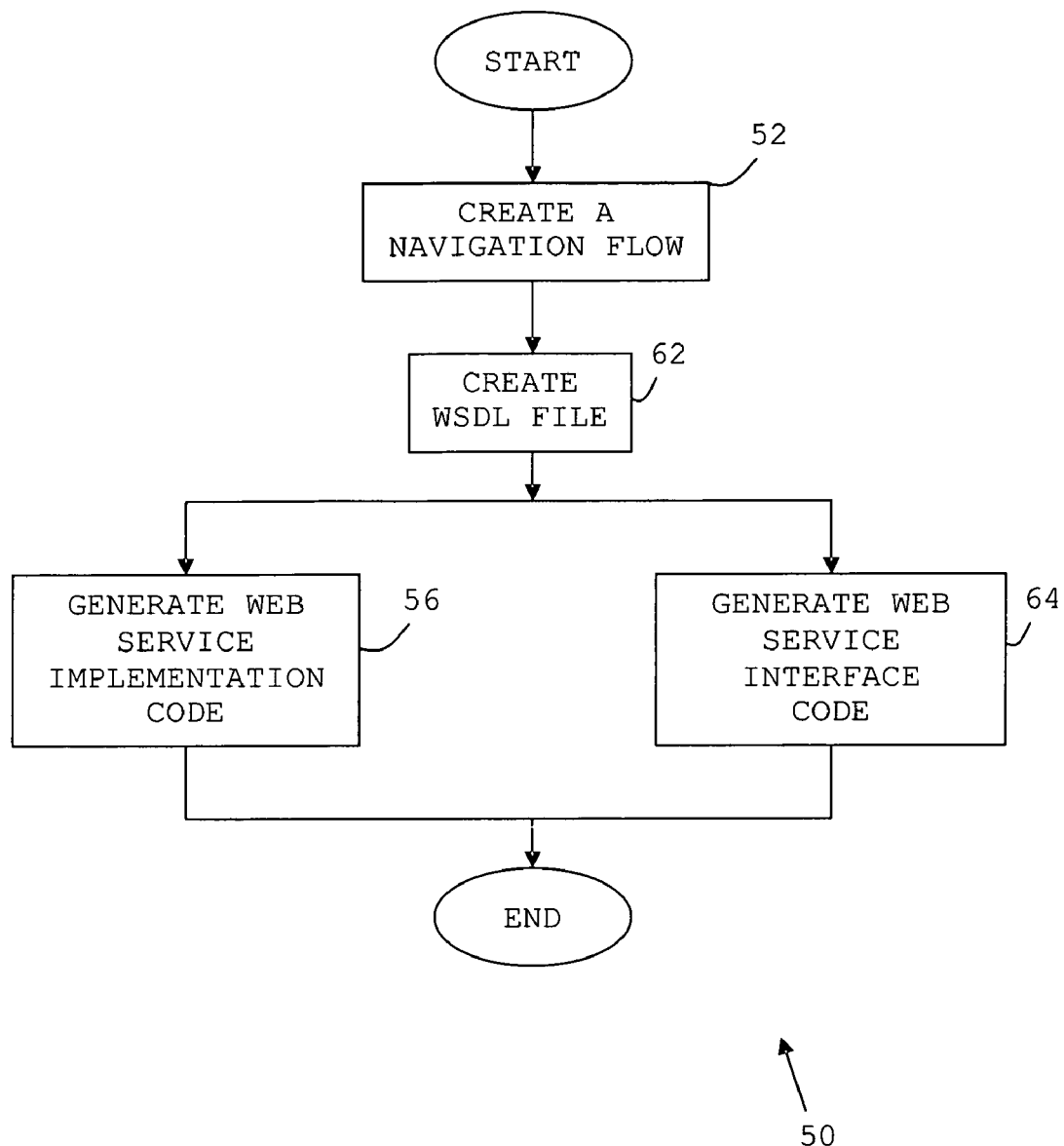
FIG. 3 shows a method in accordance with an embodiment of the invention.

An embodiment of the invention is shown as a method 50 in FIG. 3. The method is for the generation of web services from an existing web application having transactions. The web service comprises code having a module representative of the web service interface, and a module representative of the web service implementation. A navigation flow is first defined or created 52 to represent the web page interaction that the user activates while running a transaction. A script may be generated via a graphical user interface. Any other possible representation of the web page interaction forming the navigation flow may be used. The script may be stored in a memory (not shown) in the developer work station with access to the network 12. Such developer work stations are well known to a skilled person in the industry, and may include a personal computer or the like having a central processing unit, memories (e.g. random access memory, read only memory, etc.), etc. interconnected with peripheral devices such as user display and user keyboard for a developer to program and execute computer software applications, and communication means, for example a modem, for the work station to access and connect with the network 12. Such a work station may be used to implement or execute an embodiment of the invention. The script may be defined in any format that captures and defines in detail the series of manual steps or interactions the client user conducts in the web pages of the web site for completing the transaction. A sample script generated from a user navigation of a web site to load a single page is:

```
/* 1. Initial - Set Environment */
    lr_rendezvous("rendezvous_1"); /* Set rendezvous point */
    void lr_whoami ( int FAR *vuser, LPCSTR FAR *vuser_group, int FAR *scid );
    LPCSTR my_host = lr_get_host_name( );
    LPCSTR my_controller = lr_get_master_host_name( );
    lr_save_datetime("Tomorrow is %B %d %Y", DATE_NOW + ONE_DAY, "next");
    lr_output_message(lr_eval_string(""));
/* 2. Actions */
    int lr_start_transaction ( LPCSTR transaction_name ); /* Begin a Transaction */
    /* Note: LPCSTR prototype is automatically defined as char* */
        /* Command line parsing */
        lr_get_attrib_double
        lr_get_attrib_long
        lr_get_attrib_string( char *parm1 );
        void lr_peek_events ( ); /* pause */
        void lr_think_time ( int time ); /* from 0 to 32.767 */
        /* Send data points to t_rep.eve6 event file for each Vuser */
            cpu_val=cpu_check( );
            lr_user_data_point("cpu",cpu_val);
            lr_user_data_point("data_point_1",1);
        /* Begin Negative testcase */
            lr_continue_on_error(1); /* 1=Continue when error occurs */
            int lr_advance_param ( LPCSTR param ); /* next */
        /* Check whether actual results are what was expected */
            /* Info about HTTP request */
            {
            int HttpRetCode, HttpRetSize, HttpRetTime;
            web_url("dogbert","URL=http://dogbert","TargetFrame=_TOP",LAST);
            HttpRetCode = web_get_int_property(HTTP_INFO_RETURN_CODE);
            if( HttpRetCode == 200)
                lr_log_message("The Vuser successfully accessed the
                page");
            else
                lr_log_message("The Vuser failed to access the page ");
            }
            HttpRetSize = web_get_int_property(HTTP_INFO_DOWNLOAD_SIZE);
```

```
            HttpRetTime =
            web_get_int_property(HTTP_INFO_DOWNLOAD_TIME);
            /* Verify other objects: */
            int web_find( char *FindName, , , LAST ); /* text */
            int web_image_check( char *CheckName, , "alt=Alt", "src=Src",
            LAST );
            int web_java_check ( char *Name, , "Classname=...", , LAST );
/* 3. End */
int lr_end_transaction ( LPCSTR transaction_name ); /* Finish a Transaction */
```

The above script is provided for illustrative purpose having one web page interaction. An actual script would likely contain several interactions. Each transaction of the web application may be represented by such a script.

The script may be created manually, or in another embodiment, the script may be produced by a web site test tool such as IBM RATIONAL SUITE TESTSTUDIO (IBM, RATIONAL SUITE, and TESTSTUDIO are trademarks of International Business Machines Corporation in certain countries) available from International Business Machines Corporation, Armonk, N.Y., or LOADRUNNER (LOADRUNNER is a trademark of Mercury Interactive Corporation in certain countries) available from Mercury Interactive Corporation, Sunnyvale, Calif. The web service code may then be generated from the existing web application using the navigation flow stored as script files in the present invention. The web service implementation 46 and the web service interface 44 are generated. The web service interface 44 and the web service implementation 46 may be generated in parallel as shown in FIG. 3 or in any other order.

The web service implementation code is generated 56 from the navigation flow. The web service implementation code simulates the web page interactions for transactions 22-24. The web service implementation 46 interfaces or interacts with the web application interface 32.

In another embodiment, the navigation flow of the web service implementation code may be generated automatically by a web site test tool, which generates regression tests such as IBM RATIONAL SUITE TESTSTUDIO. These tools create the code simulating the module for interaction between web pages. The web service implementation may be written in Java code, .net or the like.

To generate the web service interface code to interact and interface with client or user application 20, a WSDL file is created 62 from the navigation flow. The script is translated 44 by a script translator into a programming language to describe web services, such as a WSDL file, for describing the function and the input and output parameters for each step of each transaction. For example in one scenario the function of the transaction may be ordering a book where input and output parameters may include book title, author name, international standard book number (ISBN), or the like. The process of translating may be achieved manually. A person skilled in the art may also develop a program translating script of the navigation flow to WSDL.

Once the navigation script is translated into a language such as WSDL to describe a web service functions with their input/output parameters, the web service interface code is then generated 64. The web service interface code is generated from the WSDL file. The code may be any type of code that is compatible within the system environment, for example Java, .net, or the like. The step of web service interface code generation may be also automated if a program is developed. A person skilled in the art may develop such a program translating WSDL into Java code or the like.

The web service implementation mainly consists of modules within the web service, for example a module for calls to the functions with input and output parameters that a similar to the call registered in the generated script, and a module for code to simulate interactions within the web pages during the transaction.

Once the navigation script is complete, the method identifies a portion 144 of the navigation script that is to form part of the web service. After the portion of the navigation script is identified, the identified portions are mapped and exposed to a web site 146. The script may be translated into a WSDL file. The web service implementation is then generated 46. In other words, the web service implementation is automatically generated from the WSDL file and the recorded script. The output of the full process is a web service interface, such as a WSDL file, and the web service implementation. The web services implementation may mainly consist in calls similar to the calls registered in the generated script.

Figure 4:
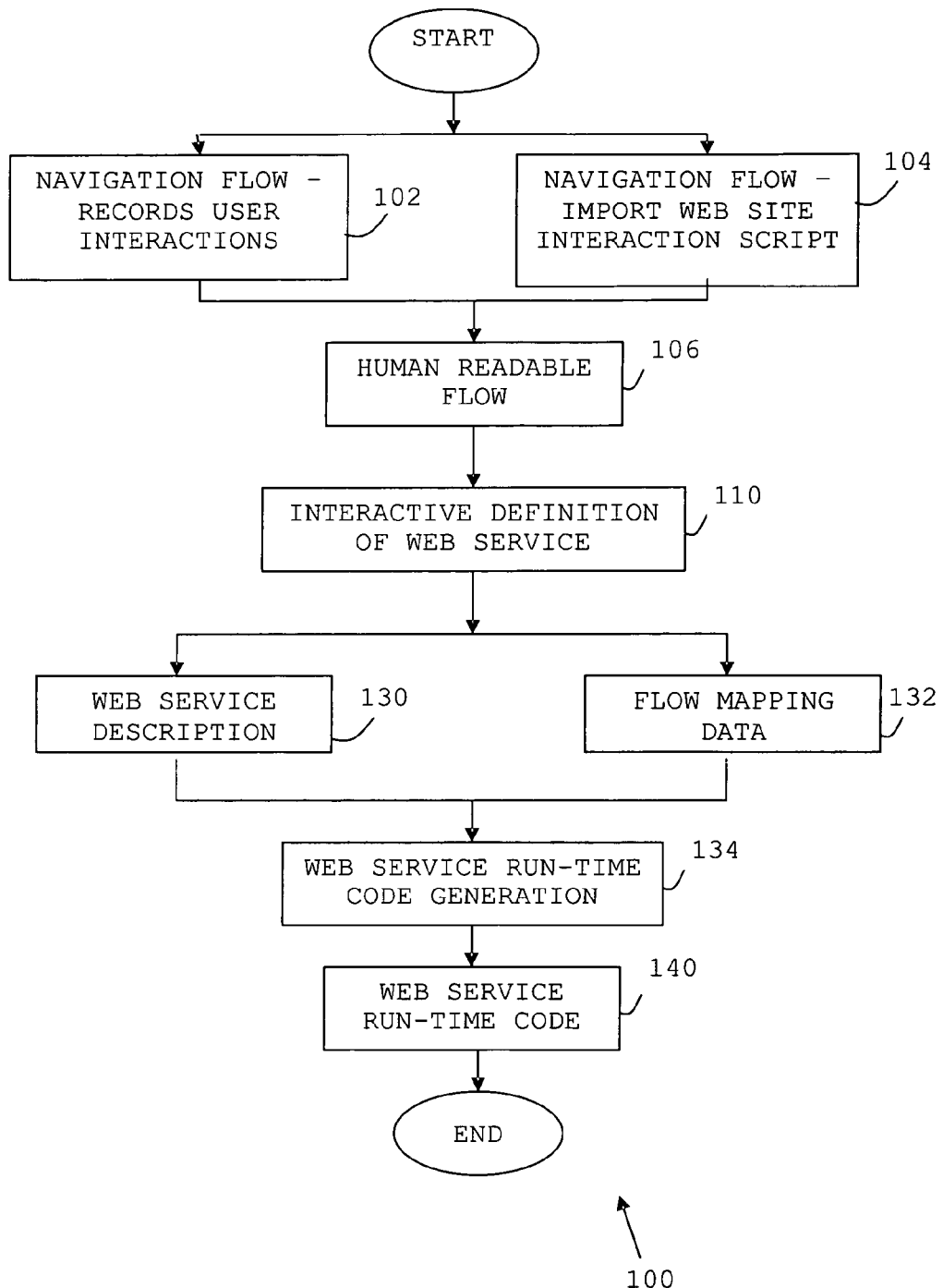
FIG. 4 shows a method in accordance with an embodiment of the invention.
Figure 6:
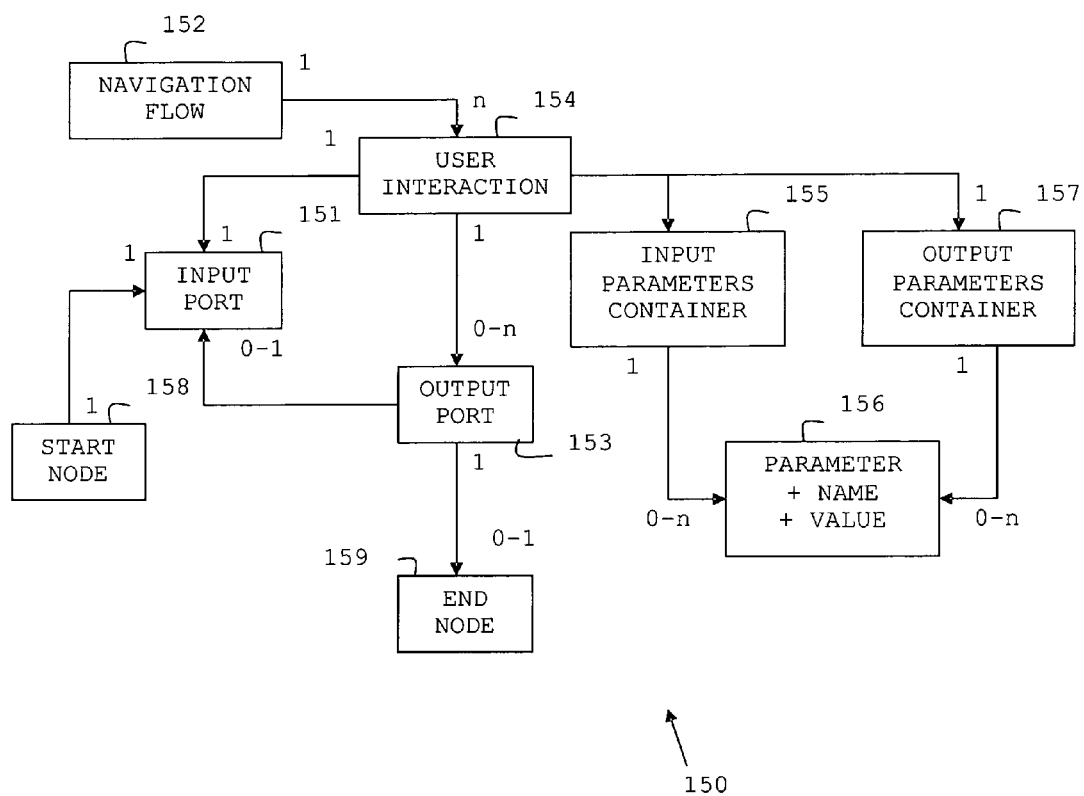
FIG. 6 shows a human readable flow mapping data structure of an embodiment of the invention.
Figure 7:
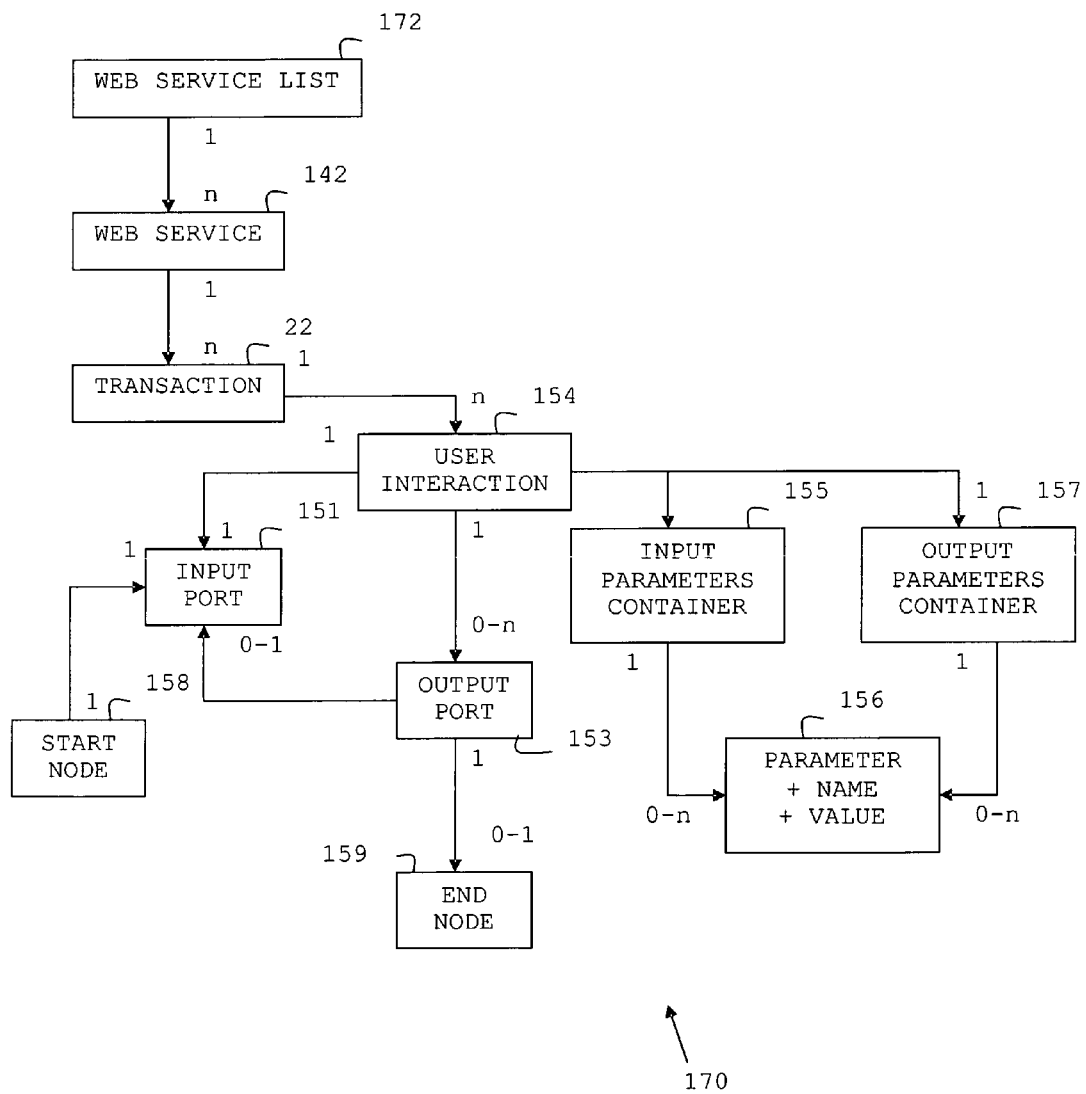
FIG. 7 shows a web service to human readable flow mapping structure in accordance with an embodiment of the invention.

In FIG. 4, a method 100 is shown for generating a web service in more detail than FIG. 3 it illustrates the computer-aided steps according to an embodiment of the present invention. A navigation flow is generated. The navigation flow may be generated by recording user interactions 102, and importing web site interaction script 104. A human readable flow reflects the human user interactions with the Web site; it is generated, as shown in FIG. 6 and 7. The user interactions with the web site may be recorded by capturing HTTP requests and responses. The interactive definition of web service is defined 110 by a series of steps shown in FIG. 5A to generated the web service description 130, and the web service to human readable flow mapping data 132. This step (110) is performed through a graphical user interface supporting all the steps of the interactive definition of the Web services and the mapping between the Web services and the human readable flow. An example is given later in the document in relation with FIG. 8, FIG. 9 and FIG. 10. This computer-aided step (110) is very novel because it uses one graphical representation this highly facilitates the task of the Web service developer. On one side, the mapping between the Web services and the user interactions with the Web site, result of this step, allows creation of the Web Service definition such as WSDL through usual tools from the prior art. On the other side, the result of step 110, is a very comprehensive structure (132) describing the Web service human readable flow mapping data which is the data structure described in FIG. 7.

Generating the web service description (130), for example such as translating to a WSDL file, may be achieved by programs of prior art starting from the web service graphical definition. Starting from the comprehensive data structure, result of step 110, the run-time code (140) can be automatically generated (134), for example, as shown by method 134 of FIG. 5B without specific knowledge for a person skilled in the Web service technology.

Figure 5A:
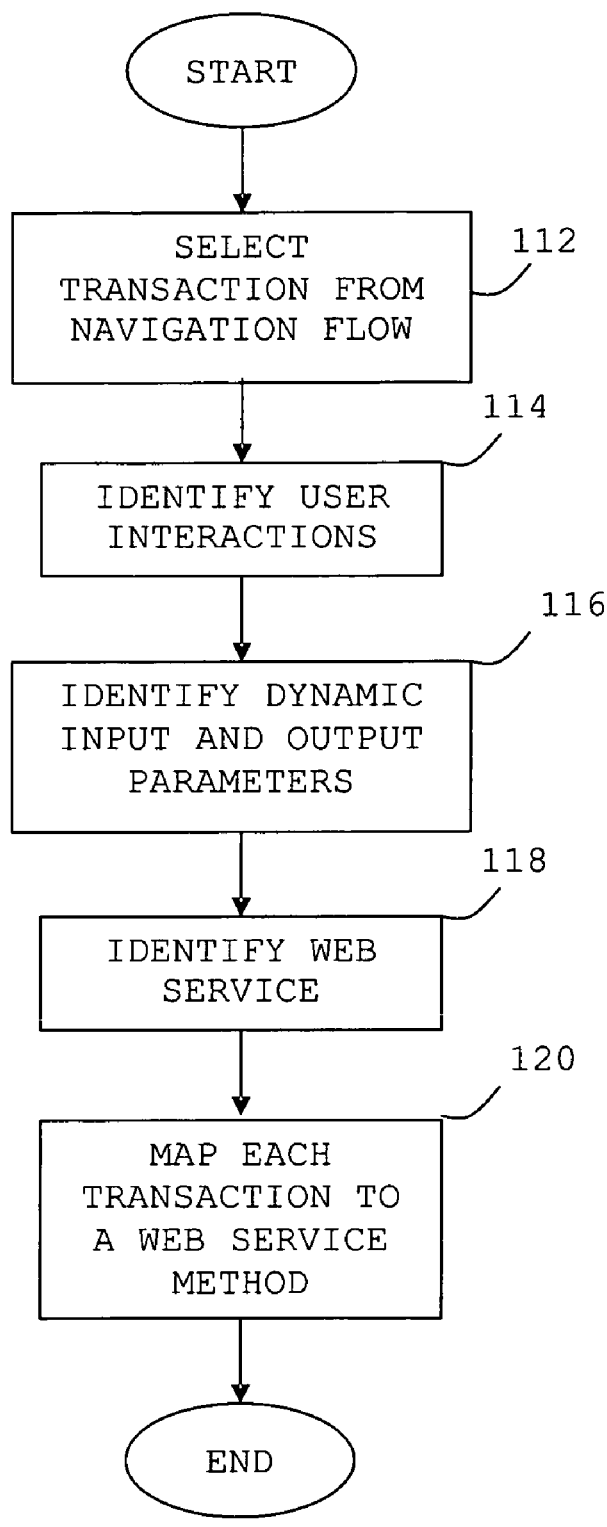
FIGS. 5A and 5B show steps of the method of FIG. 4 in more detail in accordance with an embodiment of the invention.

Also, in an embodiment, the web service to human readable flow mapping data structure 170 as shown in FIG. 4 may be based on the execution of the novel step 110 shown in FIG. 5A. The user interactions involved are identified 112 for each transaction 114. A transaction, which may be a business transaction, may be one or several user interactions recorded in the navigation flow. For each user interaction involved, dynamic input and output parameters are identified 116. The web service is identified 118, and each respective transaction is mapped 120 to the corresponding web service. The mapping technique facilitates the development of the web service Runtime code (so called the web service implementation) because it contains all the specifications for each transaction namely, the program user inputs and outputs to be programmed to generate the service. This step is illustrated and discussed in more detail with reference to FIG.8. If another transaction or series of transactions need to be mapped to a web service, then the process may of course be repeated as required.

Figure 5B:
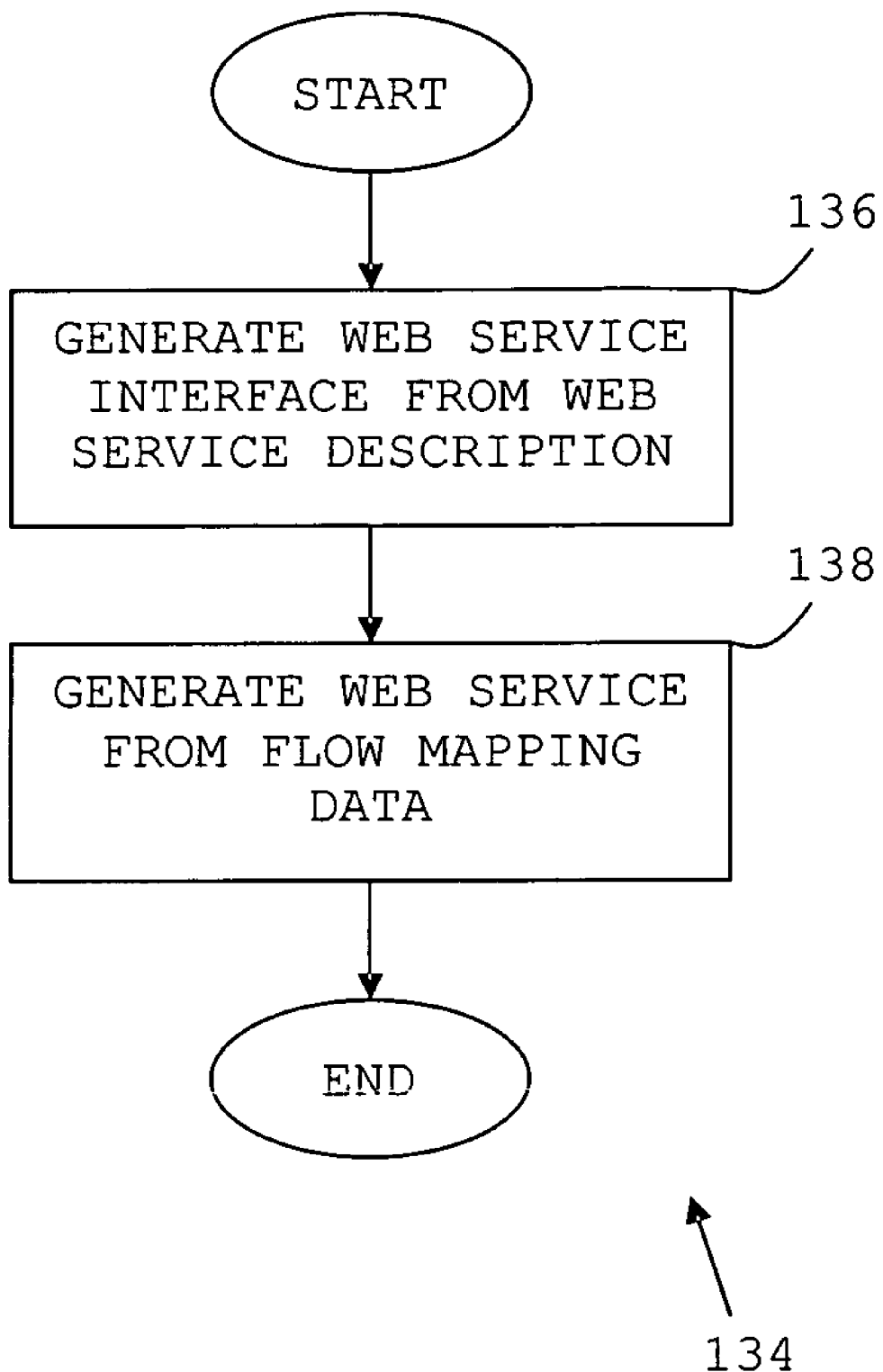

FIG. 5B shows a method 134 of a step of FIG. 4 in more detail. Implementing the web service implementation 46 from the web service description such as the WSDL file 44 may involve generating web service interface 44, 136 from the web service description. The web service implementation is automatically generated 138 from the flow mapping data of FIG. 6, where each web service contains 1 . . . n calls to an existing web site. The step 136 uses techniques of prior art and step 138 for code generation is the most tedious step of code generation.

It is noted that one user interaction corresponds in the programming of the Web service implementation to one HTTP request of the web service towards the web application. There may be more than one HTTP request per transaction. If the interface web application is not HTTP based but is standardized (FTP, SMTP) one can develop a generic code adaptable to all the standards.

In an embodiment, the human readable flow mapping data structure is shown in FIG. 6. From a navigation flow 152, generated as discussed above, a user interaction 154 is identified. One navigation flow, represented by "1" at the output of the navigation flow, may be comprised of any number of user interactions 154, represented by "n" at the input of the user interaction. Each user interaction typically contains input and output parameters that are assigned name and values 156 in input and output parameter containers 155, 157. As shown, each user interaction may contain one input port, represented by "1" at the input of input port 151, and contain none or any number of output ports, represented by "0-n" at the input port 153. Input and output parameter containers may contain none or any number of parameters, represented by "0-n" at the inputs of parameter 156. For each user interaction 154, there is a start node 158, input and output ports 151, 153, and end node 159. The end node 159 may or may not form the output of output port 153, as indicated by "0-1" at the input of output port. In an example, the user interaction 154 may represent an HTML form submission, or the like. The input and output containers may be an http request, or the like. The human readable flow of FIG. 6 is a subset of the data structure of FIG. 7.

The human readable flow mapping data structure 170 of FIG. 7 is representative of the method 110 of FIG. 5A. The flow mapping of the web service list 172, web service 42 and transaction 22 is shown. The web service list 172 lists one or more web services that may be contained in the human readable flow. The transaction may have an interface similar to the user interaction 154, for example, one input and output parameter containers, and one input and output ports. The transaction interface in the example of FIG. 7 incorporates the user interaction 154 interface shown in FIG. 6, and as discussed above.

The notation used to represent the data structures in FIG. 6 and 7 is RWIN in the method of the preferred embodiment. Any other data structure graphical representation can be used.

Figure 8:
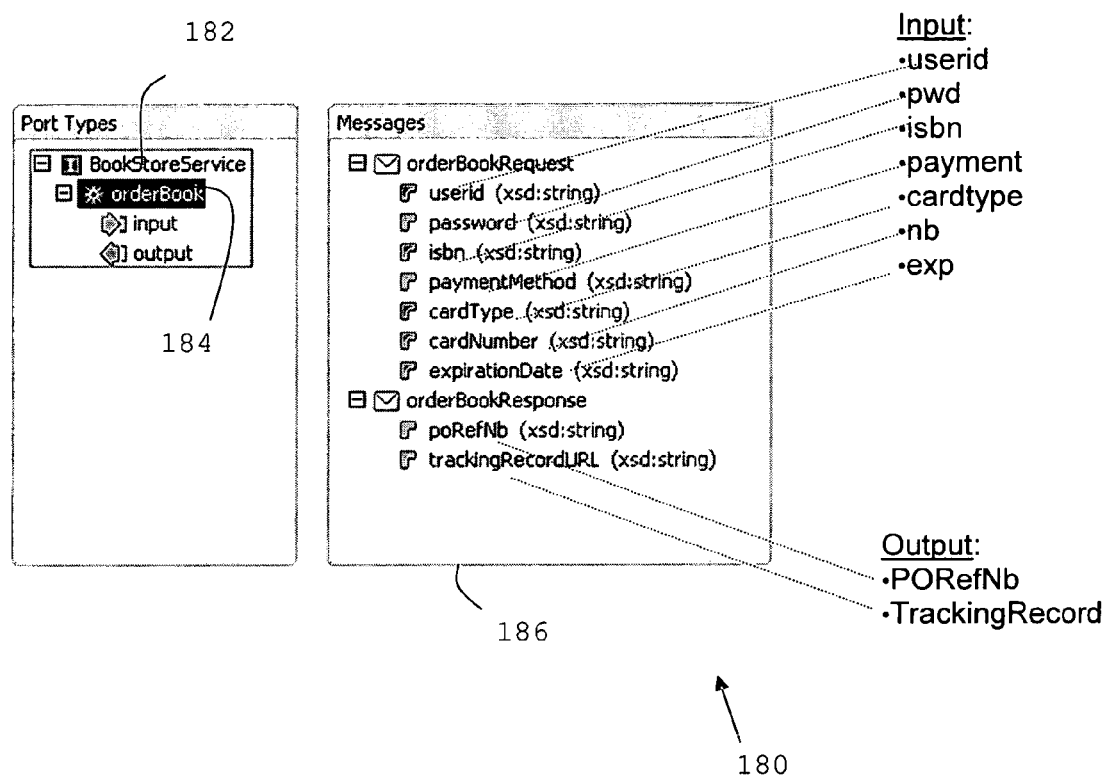
FIG. 8 shows a snap shot of a graphical user interface for defining a web service and mapping the operation to the user transaction in accordance with an embodiment of the invention.

Referring to FIG. 8, defining a web service by mapping operations to the user transactions is shown by graphical user interface 180. In this example, a book store service is shown for mapping an order book operation to the user transaction. In the left box of the screen entitled "Port Types" a user defines a web service 182, such as "BookStoreService" 182, and defines an operation 184, such as "orderBook". In the right box of the screen entitled "Messages", input variables or parameters, such as "userid", "pwd", "isbn", "payment", "cardtype", "nb", and "exp", and output parameters "PORefNb" and "TrackingRecord" are defined and mapped to the corresponding strings to generate the text file. The user maps transaction's name and parameters to the web service's operation 186. This web service tool generates the text file, such as WSDL file, and may be programmed in any known language, such as an applet plug-in. The WSDL file is created by mapping between the navigation flow as discussed and generated.

Figure 9:
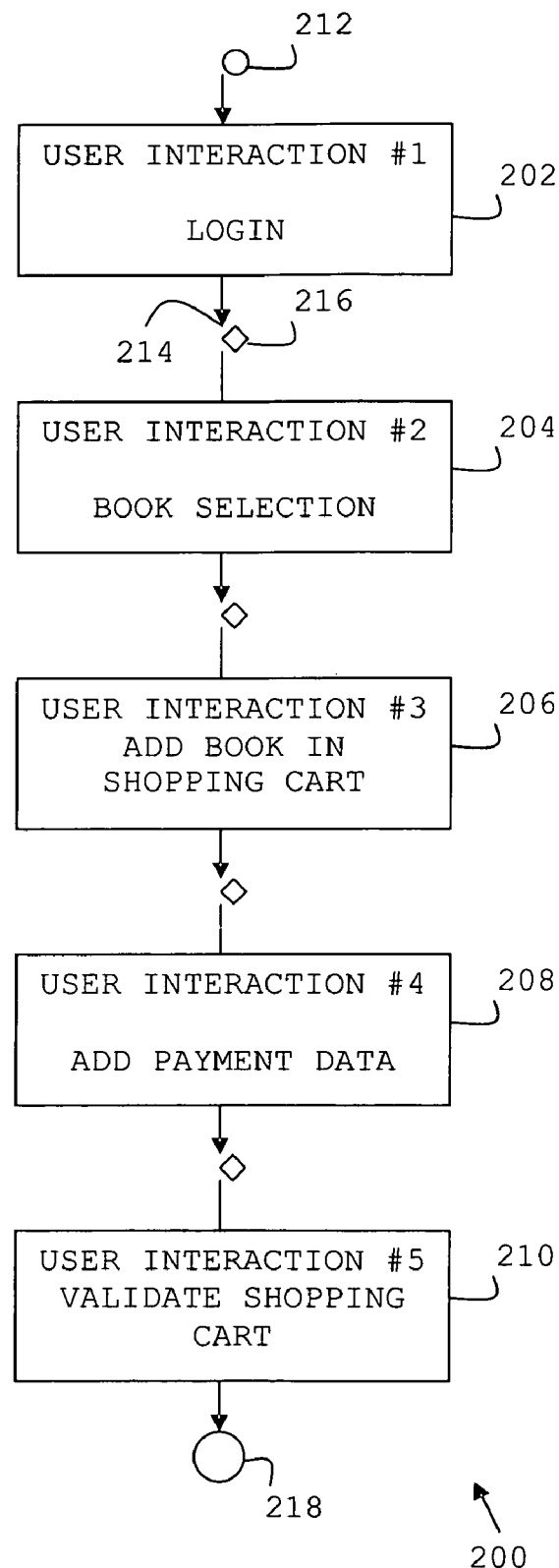
FIG. 9 shows a method for defining a transaction from a navigation flow in accordance with an embodiment of the invention.
Figure 10:
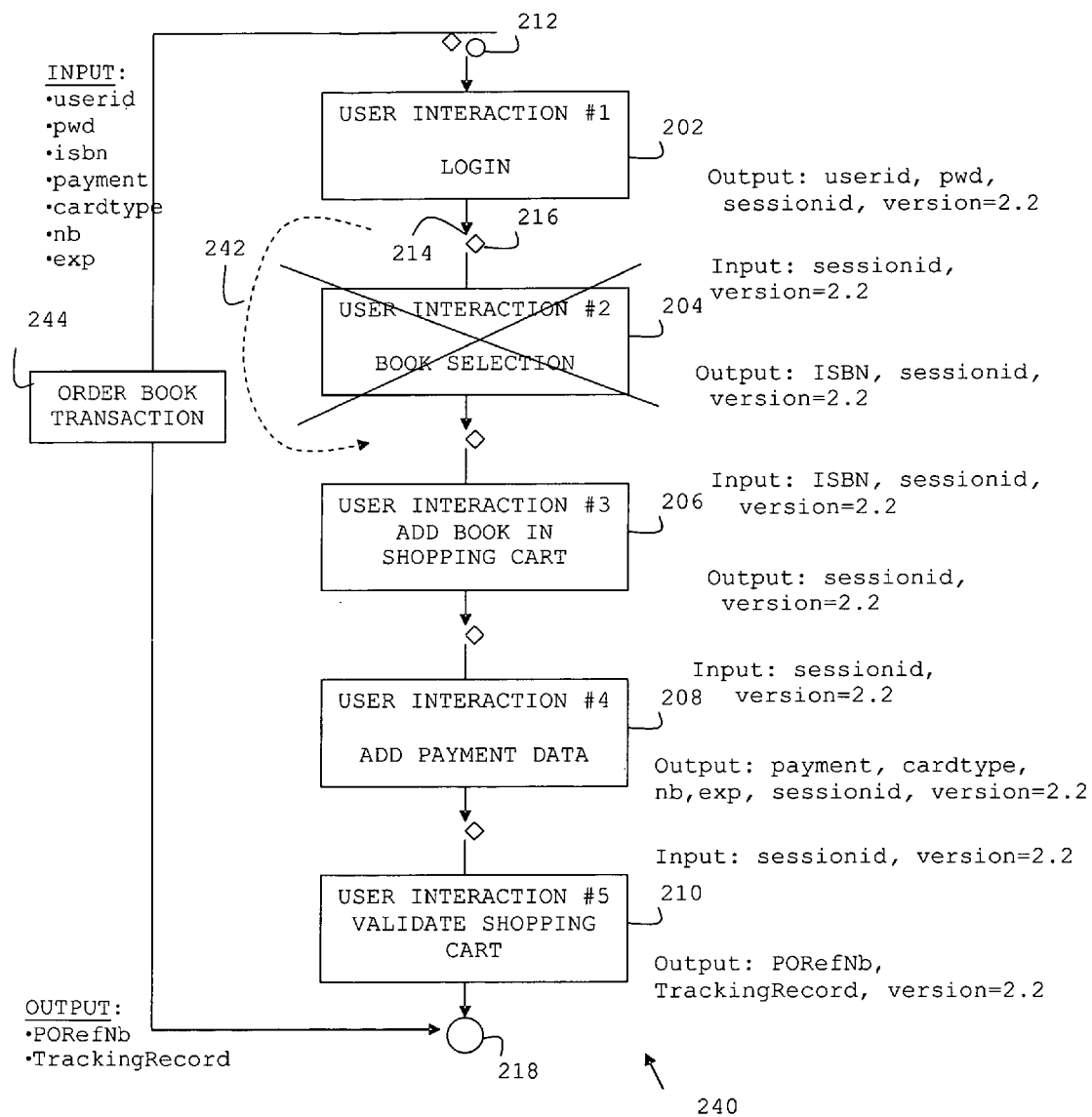
FIG. 10 shows a method for defining a transaction from human readable navigation flow in accordance with an embodiment of the invention.

With reference to FIG. 9 and 10, the example of ordering a book online as the web service transaction is shown in greater detail. FIG. 9 shows a human readable navigation flow example, and FIG. 10 shows defining a transaction from a navigation flow. The start node 212 is also an input port, having input of version=2.2 in the input parameter container. The user interactions 1-5 include login 202, book selection 204, add book in shopping cart 206, add payment data 208, and validate shopping cart 210. Between each user interaction is an output port 214 and input port 216. An end node 218 follows user interaction 5, 210. For each user interaction, there is an input and output parameter container, where each parameter has a name as shown. The output parameter container for user interaction 1,202 is userid=doe, pwd=tee42, sessionid=aa234, version=2.2. For user interaction 2,204 the input parameter container is sessionid=aa234, version=2.2, and the output parameter container is ISBN=1-931182-02-7, sessionid=aa234, version=2.2. For user interaction 3,206 the input parameter container is ISBN=1-931182-02-7, sessionid=aa234, version=2.2, and the output parameter container is sessionid=aa234, version=2.2. For user interaction 4,208 the input parameter container is sessionid=aa234, version=2.2, and the output parameter container is payment=creditcard, cardtype=AMEX, nb=7777-5678-9876-2435, exp=07-06, sessionid=aa234, version=2.2. For user interaction 5,210 the input parameter container is sessionid=aa234, version=2.2, and the output parameter container is PORefNb=14256, TrackingRecord, http://www.booksonline.com//tracking.php?poid=14256, version=2.2.

Referring to FIG. 10, the same user transactions 1-5,202-210 shown in FIG. 9 are shown in FIG. 10. In FIG. 10, the variable names are mapped with corresponding input and output parameters. A user may graphically re-define the navigation as shown by dashed arrow 242 and cross out of user interaction 2,204. In this instance, the order book transaction 244 proceeds from user interaction 1,202 to user interaction 3,206 directly. A user may also graphically define transaction's input/output parameters from existing user interactions. The parameter may be defined by the user with a constant value, for example version=2.2 is a constant value in this example. In this example, the user may graphically define order book transaction from the original flow, without requiring the user to have advanced programming skills.

It will be understood that the system and method for automatically generating web services from an existing web site described above provides advantages, such as automatic generation of web services from web-page based transactions. With this configuration, the generation and subsequent maintenance of the web service is less complex than previously achievable, and web-page based transactions may be deployed as web services from an existing web application. Embodiments of the invention may involve either B2C and/or B2B transactions, or the like, where either B2C and B2B may be conducted with a manual or programmatic approach. Embodiments of the invention may also be implemented on, or to interface and interact with, any devices that are capable of accessing the network 12, for example work stations, personal computers, personal digital assistants, mobile cell telephones, and the like. Additionally, an embodiment of the invention may be implemented in a combination of hardware and/or software components as discussed. It will be appreciated that specific embodiments of the invention are discussed for illustrative purposes, and various modifications may be made without departing from the scope of the invention as defined by the appended claims.

The invention claimed is:

1. A method for generating a web service providing a programming interface between a web application and a user application, said method comprising the steps of:
    creating a human readable navigation flow by defining a script of a navigation flow of at least one transaction of the web application, the navigation flow representative of interactions between a user and a web application interface of the web application during said at least one transaction, through a graphical user interface of the user application; wherein the human readable navigation flow is created by recording the navigation flow of the user conducting a transaction in the web application by capturing HTTP requests and responses;
    automatically creating a text file using the script of the navigation flow, wherein the text file describes the web service by describing a function and input and output parameter data identified by the user in the graphical user interface to be called by the user application for executing the at least one transaction, and wherein creating the text file includes: identifying a portion of the script for generating the web service and mapping the input and output parameter data to the web service to form the text file describing the web service;
    automatically creating with a code converter a web service interface code corresponding to the function as described in the text file; and
    automatically creating with the code converter a web service implementation code for executing the interactions corresponding to the at least one transaction as represented by the navigation flow.

2. The method of claim 1 wherein said creating a web service implementation code, the navigation flow is generated by a regression test tool.

3. The method of claim 1, wherein the navigation flow is written in script language.

4. The method of claims 1, wherein the text file is a Web Service Description Language (WSDL) file.

5. A computer system comprising:
    at least one computing device configured to generate a web service providing a programming interface between a web application and a user application by:
    creating a human readable navigation flow by defining a script of a navigation flow of at least one transaction of the web application, the navigation flow representative of interactions between a user and a web application interface of the web application during said at least one transaction, through a graphical user interface of the user application; wherein the human readable navigation flow is created by recording the navigation flow of the user conducting a transaction in the web application by capturing HTTP requests and responses;
    automatically creating a text file using the script of the navigation flow, wherein the text file describes the web service by describing a function and input and output parameter data identified by the user in the graphical user interface to be called by the user application for executing the at least one transaction, and wherein creating the text file includes: identifying a portion of the script for generating the web service and mapping the input and output parameter data to the web service to form the text file describing the web service;
    automatically creating with a code converter a web service interface code corresponding to the function as described in the text file; and
    automatically creating with the code converter a web service implementation code for executing the interactions corresponding to the at least one transaction as represented by the navigation flow.

6. The system of claim 5, wherein said navigation flow is generated by a regression test tool.

7. The system of claim 5, wherein the navigation flow is written in script language.

8. The system of claim 5, wherein the text file is a Web Service Description Language (WSDL) file.

9. The system of claim 5, wherein the web service is implemented in a web server hosting the web application.

10. The system of claim 5, wherein the web application is hosted on a web server, and the web service is hosted by another server.

11. A program product stored on a computer readable storage medium, which when executed, enables a computer system to generate a web service providing a programming interface between a web application and a user application, the program product comprising computer program code for enabling a computer system to:
    create a human readable navigation flow by defining a script of a navigation flow of at least one transaction of the web application, the navigation flow representative of interactions between a user and a web application interface of the web application during said at least one transaction, through a graphical user interface of the user application; wherein the human readable navigation flow is created by recording the navigation flow of the user conducting a transaction in the web application by capturing HTTP requests and responses;
    create a text file using the script of the navigation flow, wherein the text file describes the web service by describing a function and input and output parameter data identified by the user in the graphical user interface to be called by the user application for executing the at least one transaction, and wherein creating the text file includes: identifying a portion of the script for generating the web service and mapping the input and output parameter data to the web service to form the text file describing the web service;

create with a code converter a web service interface code corresponding to the function as described in the text file; and create with the code converter a web service implementation code for executing the interactions corresponding to the at least one transaction as represented by the navigation flow.

* * * * *